Oct. 22, 1968 G. Q. EVANS Re. 26,481

STACKING FRAME ASSEMBLY FOR A PALLET

Original Filed Aug. 26, 1965 3 Sheets-Sheet 1

INVENTOR.
GEORGE Q. EVANS
BY Huebner & Worrel
ATTORNEYS.

STACKING FRAME ASSEMBLY FOR A PALLET

Original Filed Aug. 26, 1965 3 Sheets-Sheet 2

INVENTOR.
GEORGE Q. EVANS
By Huebner & Worrel
ATTORNEYS.

STACKING FRAME ASSEMBLY FOR A PALLET

Original Filed Aug. 26, 1965 3 Sheets-Sheet 3

INVENTOR.
GEORGE Q. EVANS
By Huebner & Worrel
ATTORNEYS.

United States Patent Office

Re. 26,481
Reissued Oct. 22, 1968

26,481

STACKING FRAME ASSEMBLY FOR A PALLET

George Q. Evans, 204 S. Locust St.,
Compton, Calif. 90221

Original No. 3,289,613, dated Dec. 6, 1966, Ser. No. 482,756, Aug. 26, 1965. Application for reissue Apr. 21, 1967, Ser. No. 641,721
6 Claims. (Cl. 108—53)

Matter enclosed in heavy brackets [ ] appears in the original patent but forms no part of this reissue specification; matter printed in italics indicates the additions made by reissue.

This invention relates to a stacking frame assembly for a pallet, and more particularly to a frame which is secured to a pallet whereby a pallet may be stacked on top of the frame and in which the frame is readily detachable from the pallet to which it is secured.

An object of this invention is to provide a stacking frame assembly which may be detachably secured to a pallet so as to provide an upright framework upon which other pallets may be supported without crushing the merchandise disposed on the lower pallet.

Another object of this invention is to provide a stacking frame for a pallet comprised of a plurality of upright leg sections interconnected by arm sections at their upper ends and secured to the pallet [a] *at* their lower ends by detachable foot brackets or members.

Still another object of this invention is to provide a stacking frame assembly for a pallet wherein the stacking frame assembly is of the type which includes upright leg sections interconnected at their upper ends and foot brackets at their lower ends wherein the foot brackets include [plates] *elements* which are disposed so as to engage a top surface [and a bottom surface] of the upper platform *and marginal edges* of the pallet.

A further object of this invention is to provide a stacking frame assembly for a pallet which includes leg sections extending upright from the pallet which are resilient laterally so they may be sprung and the foot brackets may be biased inwardly against the pallet to achieve a tight locking fit therewith and to increase the stability and rigidity of the assembly.

A still further object of this invention is to provide a stacking frame assembly which is detachably engageable with the pallet and yet can be readily disassembled for storage.

Another object of this invention is to provide a stacking frame assembly which is to be secured to the periphery of a pallet wherein the stacking frame assembly includes a plurality of upright leg members inclined at a slight angle inwardly where the leg sections are interconnected at their upper ends and detachably secured by foot brackets to peripheral portions of the pallet at each of their lower ends.

These and additional objects and advantages of the invention will become apparent from the drawing and detailed description which follows.

Figure 1:
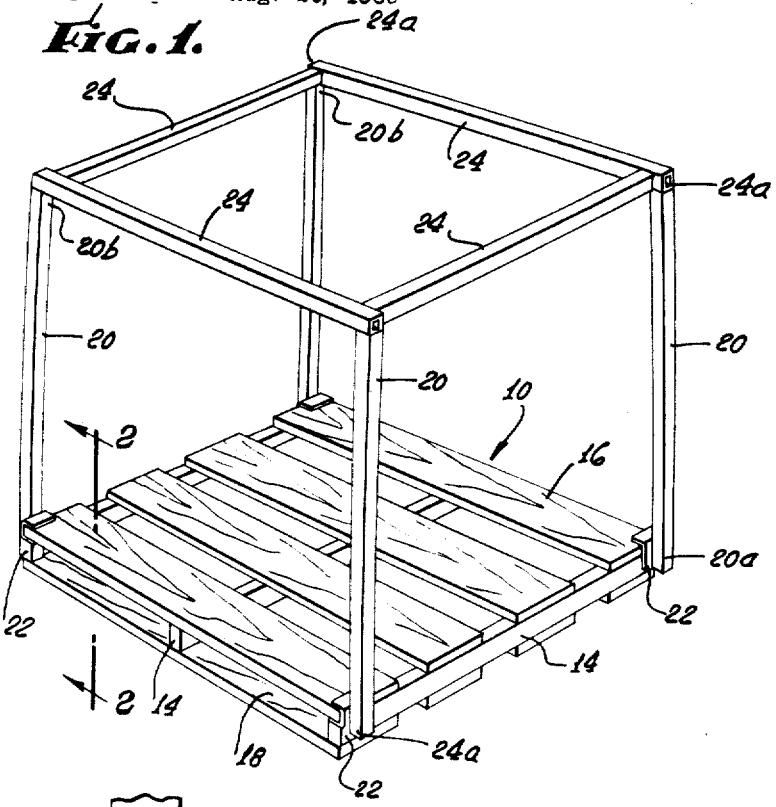
FIGURE 1 is a perspective view of a pallet with an embodiment of the stacking frame assembly secured thereto.

Referring to the drawings a conventional pallet 10 is utilized with a stacking frame assembly generally designated 12 so that when pallets 10 are loaded with merchandise another pallet can be supported on top of the stacking frame assembly and be spaced so that merchandise on the lower pallet will not be crushed.

Pallet 10 is comprised of parallel stringers 14 which are secured between upper platform 16 and lower platform 18. Platforms 16 and 18 may be made of any suitable material such as sheet plywood, or as illustrated in the drawings, spaced parallel boards or slats. Generally the upper and lower platforms 16 and 18 have peripheral surfaces flush with the outer side faces of the two outside stringers 14 to which they are secured. The ends of stringers 14 are also generally cut off flush with the peripheral surface of platforms 16 and 18.

Figure 5:
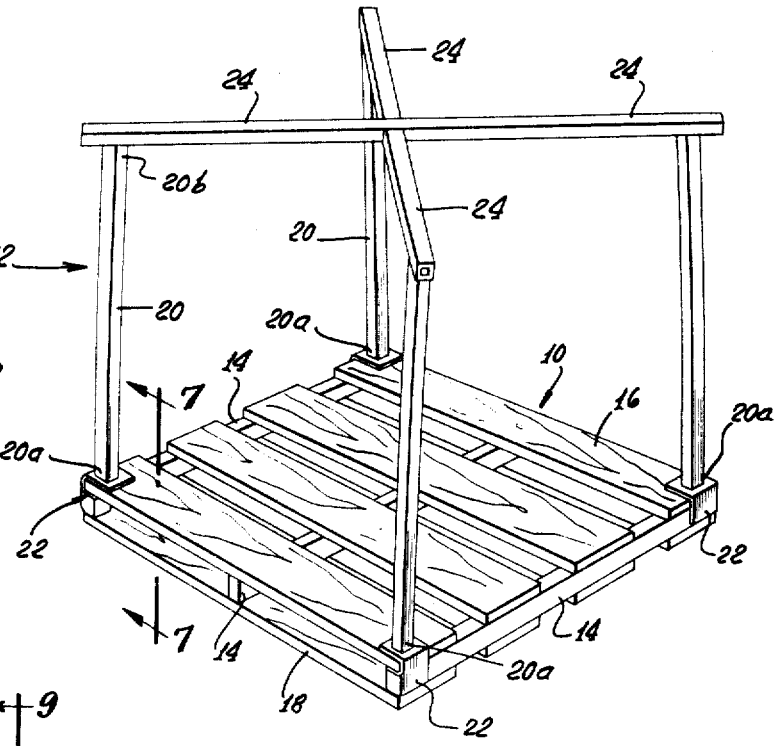
FIGURE 5 is a perspective view of another embodiment of a stacking frame assembly attached to a pallet.
Figure 10:
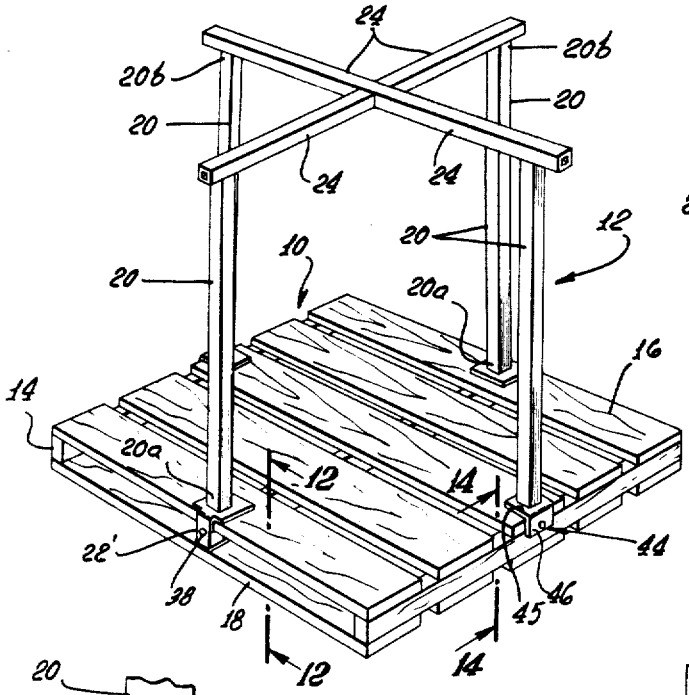
FIGURE 10 is a perspective view of another embodiment of a stacking frame assembly attached to a pallet.

The stacking frame assembly 12 is comprised of independent integral leg sections 20 which are secured at their lower ends 20a to foot members or brackets 22 and at their upper ends 20b to interconnected arm sections 24. The arm sections 24 may be interconnected at each of their ends 24a to the upper ends 20b of leg sections 20 as shown in FIGURE 1 so as to define a [polygon] *rectangle* or may cross in the center as shown in FIGURES 5 and 10. Foot brackets 22 may be secured to the periphery of pallet 10 at each of its corners as shown in FIGURES 1 and 5 or in an intermediate peripheral portion of pallet 10 as shown in FIGURE 10.

Figure 2:
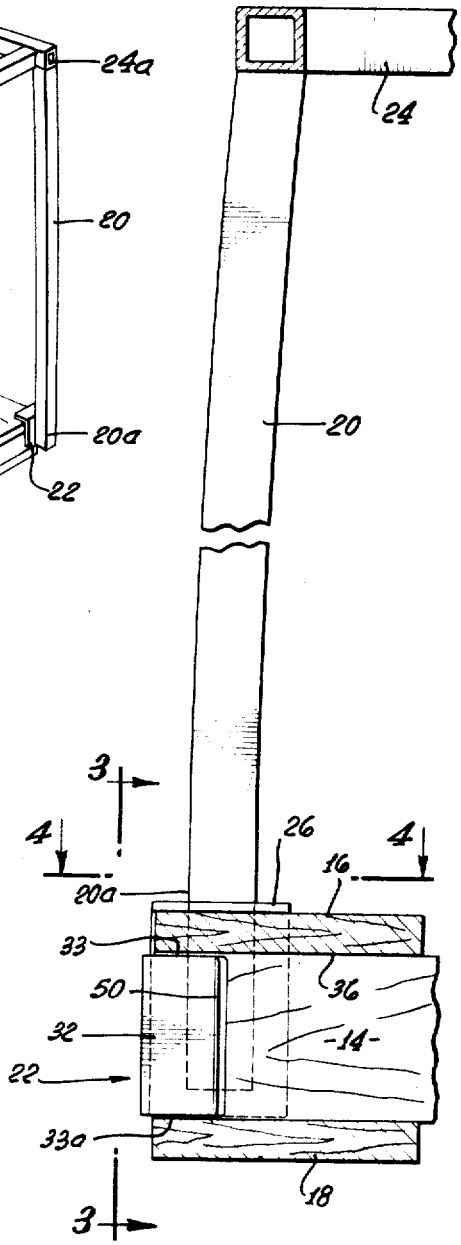
FIGURE 2 is a fragmented partial sectional view taken on line 2—2 of FIGURE 1 showing a leg section of the frame in elevation.
Figure 3:
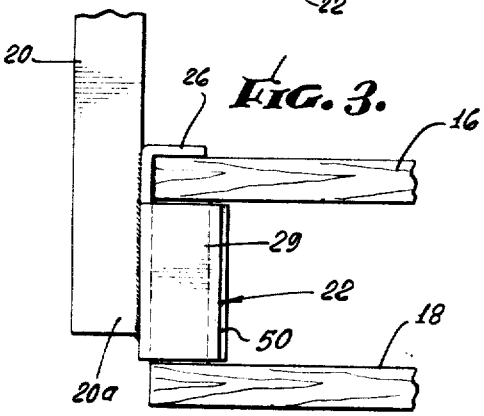
FIGURE 3 is a fragmented elevational view taken on line 3—3 of FIGURE 2 showing the interconnection of a foot bracket of a leg section to a pallet.
Figure 4:
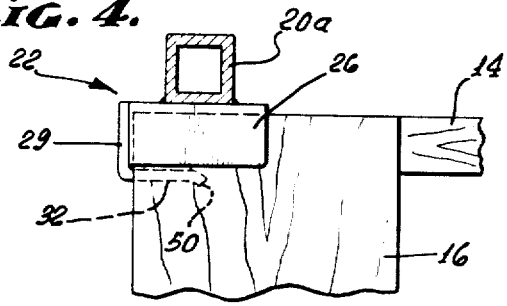
FIGURE 4 is a fragmented partial sectional view taken through line 4—4 of FIGURE 2 showing a top view of the interconnection of a foot member to a pallet.

In each of the embodiments of this invention, when the foot brackets 22 of the stacking frame assembly 12 are secured to a peripheral portion of pallet 10 the length of each of the leg sections 20 is such that the interconnected arm sections 24 will be disposed in a plane parallel to the plane of pallet 10. The leg sections 20 are preferably made of a tubular metal which has longitudinal rigidity but enough lateral resiliency that the leg sections 20 can be sprung outwardly from the pallet to which they are secured so as to detach or engage foot members 22. The leg sections 20 extend upright generally from the peripheral portions of pallet 10 but, as best seen in FIGURE 2, are inclined slightly (preferably approximately 2°) inwardly. The amount of incline and the particular disposition of the leg sections will depend upon the resiliency of the material of which they are made and the particular location and abutment of the foot brackets to the periphery of pallet 10.

A superior stacking frame assembly is provided in accordance with this invention due to the securely engageable, but quickly detachable foot brackets 22. This is because of the particular structural arrangement of the leg sections 20 relative to the structure of the foot brackets and their abutting slidingly detachable engagement with the periphery of the pallet to be described herinafter.

Figure 6:
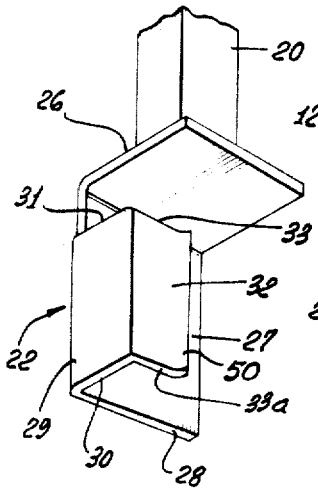
FIGURE 6 is a perspective view of a foot bracket at the end of a leg section.
Figure 7:
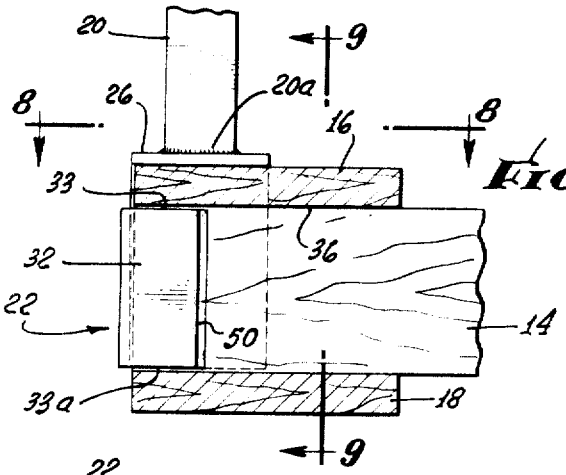
FIGURE 7 is a fragmented partial sectional view taken through line 7—7 of FIGURE 5 showing the attachment of the foot bracket to a pallet.
Figure 8:
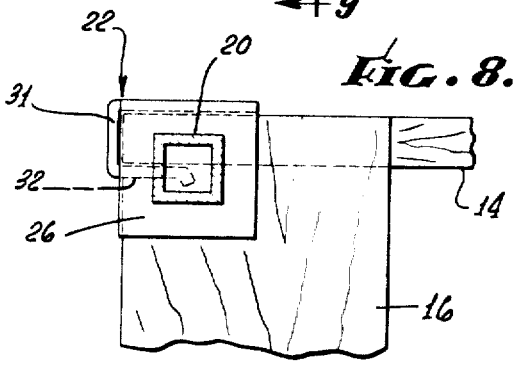
FIGURE 8 is a fragmented partial sectional view taken through line 8—8 of FIGURE 7 showing a top view of the connection of the foot bracket to the pallet.
Figure 9:
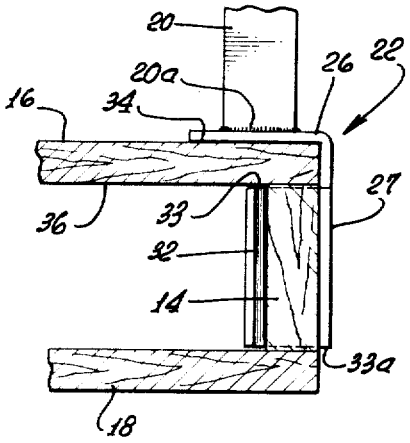
FIGURE 9 is a fragmented sectional view taken on line 9—9 of FIGURE 7 showing the interconnection of the foot bracket to the pallet.

The foot bracket 22 utilized to secure the stacking frame assembly 12 to the pallet embodiments illustrated in FIGURES 1 through [10] *9* is shown most clearly in FIGURE 6.

The foot bracket generally designated 22 is an inverted L-shaped structure including a flat base or horizontal plate 26 and a leg or vertical plate 27 depending downwardly from and generally normal to said base 26, and terminating in an end 28 which is generally parallel to the plane of said base 26. [Said leg or vertical plate 27 includes a wing 29 which is normal to said leg portion 27 and extends upwardly having a lower end 30 on a plane with end 28 of leg 27 and terminating at an upper end 31 below base 26. The wing 29 includes an inwardly bent resilient flange 32 which is generally parallel to said leg plate 27 and of a corresponding height therewith including an upper end 33 and a lower end 33*a* on the same plane as ends 28 and 30 respectively.] *Extending from said leg plate 27 is a wing 29 which is normal thereto. Said wing 29 includes a lower end 30 on a plane with end 28 of leg plate 27 and said wing extends upwardly therefrom. A resilient flange 32 is bent inwardly from said wing 29 and terminates at its upper end 33 in spaced relation to said base 26 the space being slightly greater than the thickness of platform 16. The flange 32 includes a lower end 33a generally on a plane with the ends 28 and 30 of leg 27 and wing 29, respectively.* In the preferred construction of the foot bracket 22 the flange 32 is slightly overbent from the parallel toward the plate 27 and includes an outturned rounded guide lip 50 which will guide the *foot bracket 22 into frictional engagement with* stringer 14 [into engagement, and the flange 32 will be moved parallel with the plate 27 and a tight frictional grip of the stringer will be insured].

The height of the [wing and] flange [28 and] 32 [respectively,] is slightly less [in height] than *that of* a stringer 14 spaced between the upper and lower platforms 16 and 18. The inner width of the wing 29 is slightly greater than the thickness of a stringer 14 [, and the space between the ends 31 and 33 of the wing and flange 29 and 32 and the base 26 is preferably slightly greater than the thickness of the upper platform 16].

Thus, in use *base 26 of* foot bracket 22 is disposed on the top surface 34 of upper platform 16 [and the upper end 31 and 33 of the wing 29 and flange 32 respectively will bear against the bottom surface 36 of upper platform 16] *and the wing 29 bears against the end of a stringer, which is generally flush with the marginal edges of the platforms.* The [side portions of] stringer 14 will be securely engaged and disposed between the leg [portion] *plate* 27, wing 29 and flange 32 and substantially all of the stringer *portion engaged* [immediately adjacent to the point of engagement with foot bracket 22] will be protectively covered by said [member] *bracket.* It can therefore be observed that a tight secure fit will be provided by a foot bracket 22 both on the top of the platform 16, [beneath the platform 16] and around the adjacent stringer 14. Also due to the lateral resiliency and inclined angle of leg sections 20 the engagement will be a tight inwardly bearing frictional type which also can be detached by urging the leg sections laterally outward so that the foot brackets are detached from engagement with pallet 10.

*The upper end 33 of the flange 32 will serve as a stop to prevent the foot bracket 22 from becoming vertically disengaged from the pallet 10.*

Foot bracket 22 is substantially the same in the embodiment shown in FIGURES 1 through 4 as in FIGURES 5 through 9 except that in the former embodiment the lower end 20a of the leg sections 20 are secured by welding or other means to the outside surface of leg plate 27 and in the latter embodiment the lower end 20a of foot bracket 22 is secured by welding or other means to the top of upper plate 26.

Figure 11:
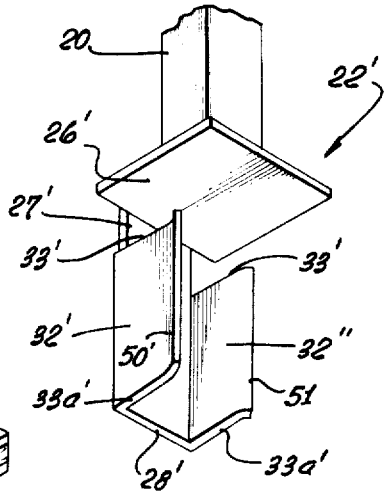
FIGURE 11 is a perspective view of a modified foot bracket extending from the leg section used in the stacking frame assembly embodiment shown in FIGURE 10.
Figure 12:
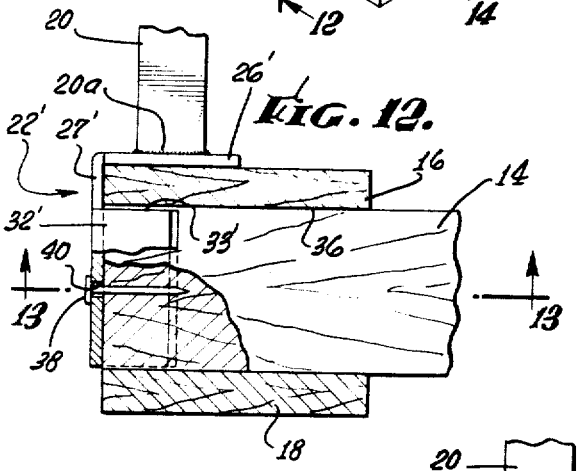
FIGURE 12 is a fragmented partial sectional view taken on line 12—12 of FIGURE 10 showing the interconnection of a foot bracket of a leg section to a pallet.
Figure 13:
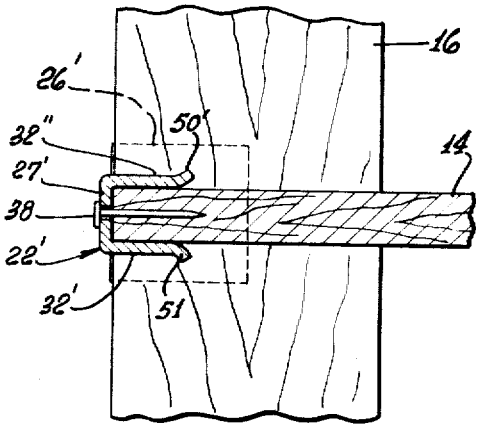
FIGURE 13 is a fragmented partial sectional view taken on line 13—13 of FIGURE 12 showing the bottom plan view of the interconnection of a foot bracket to a pallet.
Figure 14:
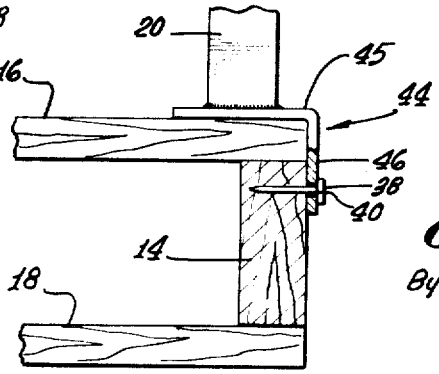
FIGURE 14 is a fragmented partial sectional view taken on line 14—14 of FIGURE [12] *10* showing the interconnection of a leg section with a side bracket to a pallet.

The modified foot bracket 22' shown in FIGURE 11 includes [substantially] *some of* the same elements as the foot bracket 22 shown in FIGURE 6 [except that] *but* the modified form is adapted particularly to be secured to an inside stringer 14 between platforms 16 and 18 rather than the corner of a pallet and an outside stringer as previously discussed. Foot bracket 22' in this embodiment includes a flat base or horizontal plate 26' and a flat leg or vertical plate 27' depending downwardly from and generally normal to the base 26' and terminating in an end 28' parallel to the plane of said base 26'. The inside width of leg plate 27' is slightly larger than the width of a stringer 14 and is less than the width of the base 26' and indented inwardly of the edges of said base 26'. A first resilient wing 32' and a second resilient wing 32'' parallel to each other [are formed on] *extend from* the plate 27' and [extend] *project* [outward] *inwardly* and generally normal to said plate 27' [when in engaging position], forming a U-shaped channel. The wings 32' and 32'' correspond in height and include upper and lower ends 33' and 33a'. When the bracket 22' is formed it is preferred that the wings 32' and 32'' are over bent from the parallel toward each other so that they may be forced to spread and will assure that the stringer 14 is clamped tightly therebetween. Lips 50' and 51 on wings 32' and 32'' act as guides for the stringer 14 to spread the wings.

The space between the ends 33' and the base 26' is preferably slightly greater than the thickness of the upper platform 16 similar to the dimension in bracket 22. Also [as in the previously described embodiment,] the space between the parallel wings *32' and 32'' at their junction with the leg plate* is slightly larger than the thickness of stringer 14. *One or both are overbent toward the other, insuring a frictional gripping of the stringer 14 between the parallel wings 32' and 32''.*

Thus, when the embodiment of the stacking frame assembly 12 as shown in FIGURE 10 is secured to a pallet 10 at least two opposing foot brackets 22' are secured to the ends of an internal stringer 14. The lower surface of upper plate 26' bears against the top surface 34 of upper platform 16 [and the upper edges 33' of wings 32' and 32'' bear against the bottom surface 36 of upper platform 16] and the inside faces of wings 32' and 32'' bear against the side portions of an inside stringer 14, and leg 27' bears against the end of stringer 14.

In the embodiment shown in FIGURE 10 [a member secured to the periphery of pallet 10 in which a side of a stringer is disposed flush with the marginal edge of the platforms are simple] *there are illustrated* L-shaped side brackets 44 comprised of a base plate 45 with a downwardly extending leg 46 normal to the plane of upper base 45. *These brackets 44 are adapted to bear against the marginal edges of the pallet.*

As in the previous embodiment the resilient legs 20 may be secured to either the base 26' or leg 27' in the same manner as previously described.

Thus, the stacking frame assembly in accordance with this invention provides a structure which is stable enough to support a significant amount of weight on its upper surface and yet is constructed so that it is readily disengageable from the pallet to which it is secured. The arm [member] *sections* 24 can be provided with disengageable means for securing to the leg sections so that they can be detached for compact storing or shipment or may as is illustrated be welded, or permanently secured to the legs 20. Also as shown in FIGURES 10, 12, 13 and 14 the foot brackets can be provided with a means for securing it more permanently to the pallet such as nail 38 extending through a hole 40 into the adjacent stringer shown in these embodiments. However, due to the tight fitting engagement of the plates of the foot bracket about the stringer and the adjacent top platform of the pallet, it normally is not necessary to provide any additional securing means as the stacking frame assembly will be held tightly in position until the leg sections 20 or 20' are purposely sprung outwardly so as to detach the brackets from engagement with the periphery of pallet 10.

While the particular stacking frame assembly for a pallet herein shown and described in detail is fully capable of attaining the object and providing the advantages hereinbefore mentioned, it is to be understood that it is merely illustrative of the presently preferred embodiments of the invention and that no limitations are intended to the details of construction or design herein shown other than as defined in the appended claims.

What is claimed is:

1. An integral stacking frame assembly for mounting on a pallet, said pallet including [a] *an upper* generally flat platform having a top and bottom surface and a plurality of parallel stringers secured to said bottom surface, ends of said stringers being flush with [the] marginal edges of said platform comprising: upright independent leg sections which are longitudinally rigid and resilient laterally of their own planes, said leg sections each being spaced apart so as to resiliently [engage] *press toward* at least two opposing sides of the periphery of a pallet on which said stacking frame is to be mounted; rigid arm sections interconnecting the upper ends of said leg sections and disposed in a plane substantially perpendicular to said leg sections so as to provide a unitary assembly therewith; foot brackets secured to the lower end of at least two of said leg sections and adapted to be detachably secured to said pallet; each of said foot brackets comprising a generally L-shaped inverted section of flat rigid material; the base of the inverted L comprising a horizontal plate adapted to seat upon the top surface of the platform; and the leg of the inverted L comprising a vertical plate adapted to bear against the marginal edge of said platform and a subjacent portion of a stringer; a vertical flat wing extending from and generally normal to the vertical plate*; a vertical flange extending from the wing at an angle thereto and* having an upper straight edge spaced downwardly from the bottom of said horizontal plate [the approximate] *a distance slightly greater than the* thickness of the platform, whereby the platform may be frictionally held between said *wing and said flange and engaged against the* bottom of said horizontal plate [and said upper straight edge] and the inner surface of said wing is adapted to bear against a surface of said stringer normal to the portion of the stringer which the vertical plate is adapted to bear against whereby said foot brackets are disengaged from a pallet by direct lateral movement outwardly generally in alignment with the axis of said stringers and are engaged with a pallet by direct lateral movement inwardly so that said foot brackets, leg sections and arm sections provide a vertically rigid unitary stacking frame structure.

2. An integral stacking frame assembly as defined in claim 1 wherein the leg sections are slightly inclined inwardly from the vertical and where said leg sections including said foot brackets may be sprung laterally to increase frictional engagement of said foot brackets with said platform and said stringers and whereby said frame assembly may be rigidified by tensioning said foot brackets and said legs.

[3. A stacking frame assembly as defined in claim 1 in which the wing therein referred to is a first wing and which includes a second wing extending from the vertical flat plate generally parallel to and spaced from the first wing and of a corresponding vertical dimension and adapted to engage a portion of the stringer opposite the portion engaged by said first wing.]

4. An integral stacking frame assembly for mounting on a pallet, said pallet including [a] *an upper* generally flat platform having a top and bottom surface and a plurality of parallel stringers secured to said bottom surface, the ends of said stringers being flush with the marginal edges of said platform comprising: upright independent leg sections which are longitudinally rigid and resilient laterally of their own planes, said leg sections each being spaced apart so as to resiliently [engage] *press toward* at least two opposing sides of the periphery of a pallet on which said stacking frame is to be mounted; arm sections interconnected with the upper ends of said leg sections and disposed in a plane substantially perpendicular to said leg sections; foot brackets secured to the lower end of at least two of said leg sections and adapted to be detachably secured to said pallet; each of said foot brackets comprising [a] *an inverted* generally L-shaped [inverted] section of flat rigid material; the base of the inverted L comprising a horizontal plate adapted to seat upon the top surface of the platform; and the leg of the inverted L comprising a vertical plate adapted to bear against the marginal edge of said platform and a subjacent portion of a stringer; a vertical flat wing extending *inwardly from and* generally normal to the vertical plate *and* having an upper straight edge spaced downwardly from the bottom of said horizontal plate [the approximate] *a distance slightly greater than the* thickness of the platform*;* [whereby the platform may be frictionally held between said bottom of said horizontal plate and said upper straight edge and the inner surface of said wing is adapted to bear against a surface of said stringer normal to the portion of the stringer which the vertical plate is adapted to bear against wherein said L-shaped inverted section includes] a flat flange corresponding in vertical dimension to the wing extending from the latter across and parallel to the vertical plate *and having an upper end on a common plane with said upper straight edge of said vertical plate whereby said platform may be frictionally held between said wing and said flange and engaged against the bottom of said horizontal plate and the inner surface of said wing is adapted to bear against a surface of said stringer normal to the portion of the stringer which the vertical plate is adapted to bear against,* and *said flange* adapted to engage a face portion of the stringer opposite the portion engaged by said vertical plate.

[5. An integral stacking frame assembly as defined in claim 4 wherein said L-shaped inverted section includes a flat resilient flange corresponding in vertical dimension to the resilient wing extending from the latter across and slightly inwardly toward the vertical plate and adapted to be sprung outwardly generally parallel to the vertical plate to engage a face portion of the stringer opposite the portion engaged by said vertical plate.]

[6. A stacking frame assembly as defined in claim 4 in which the wing therein referred to is a first resilient wing and which includes a second resilient wing extending from the vertical plate generally parallel to and spaced from said first resilient wing and of a corresponding vertical dimension each of said wings extending slightly inwardly toward each other and adapted to be sprung outwardly generally parallel to each other and grip opposed portions of said stringer and each of said opposed portions being normal to the portion of said stringers engaged by said vertical plate.]

*7. An integral stacking frame assembly as defined in claim 4 wherein said flange is resilient and slightly overbent inwardly toward said leg plate so that said flange may be sprung outwardly generally parallel with said leg plate when a stringer is engaged therebetween.*

*8. In a stacking frame assembly for mounting on a pallet, said pallet including an upper generally flat plat-*

*form having a top and bottom surface and a plurality of parallel stringers secured to said bottom surface, ends of said stringers being flush with marginal edges of said platform comprising: a vertically rigid unitary stacking frame structure including a pair of upright spaced apart independent leg sections which are longitudinally rigid and resilient laterally of their own planes; a rigid arm structure interconnecting the upper ends of said leg sections and disposed in a plane substantially perpendicular to said leg sections so as to provide a unitary assembly therewith; foot brackets secured to the lower end of said leg sections and adapted to be detachably secured to said pallet; each of said foot brackets comprising a generally L-shaped inverted section of flat rigid material; the base of the inverted L comprising a horizontal plate adapted to seat upon the top surface of the platform; and the leg of the inverted L comprising a vertical plate adapted to bear against the marginal edge of said platform and a subjacent portion of a stringer; a vertical flat wing extending from and generally normal to the vertical plate; a vertical flange extending from the wing and generally normal thereto and having an upper straight edge spaced downwardly from the bottom of said horizontal plate a distance slightly greater than the thickness of the platform, whereby the stringer will be frictionally held between said wing and said flange and said platform engaged against the bottom of said horizontal plate, the bracket carrying ends of the legs being horizontally spaced apart a distance whereby said foot brackets are engaged with a pallet by springing the legs apart and then permitting direct lateral movement inwardly generally in alignment with the axis of said stringers, and said foot brackets are disengaged from a pallet by direct lateral movement outwardly.*

*9. In a stacking frame assembly as defined in claim 8 a flange which is resilient and slightly overbent inwardly toward said leg plate so that said flange may be sprung outwardly generally parallel with said leg plate when a stringer is engaged therebetween.*

References Cited

The following references, cited by the Examiner, are of record in the patented file of this patent or the original patent.

UNITED STATES PATENTS

| | | | |
|---|---|---|---|
| 2,686,645 | 7/1954 | Whitehurst et al. | 108—53 |
| 2,828,933 | 4/1958 | De Pew et al. | 108—55 |
| 2,932,477 | 4/1960 | Franks | 108—53 |
| 3,114,339 | 12/1963 | Bayluk | 108—53 |
| 3,159,116 | 12/1964 | Skubie | 108—53 |
| 3,313,284 | 4/1967 | Bayluk | 108—53 |

BOBBY R. GAY, *Primary Examiner.*

GLENN FINCH, *Assistant Examiner.*